United States Patent
Berger et al.

(10) Patent No.: US 7,832,620 B2
(45) Date of Patent: Nov. 16, 2010

(54) METHOD FOR SOLDERING WITH A MULTISTEP TEMPERATURE PROFILE

(75) Inventors: Ingo Berger, Zeuthen (DE); Jan Münzer, Berlin (DE); Ingo Reinkensmeier, Fröndenberg (DE); Silke Settegast, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/486,205

(22) Filed: Jun. 17, 2009

(65) Prior Publication Data

US 2009/0314825 A1 Dec. 24, 2009

(30) Foreign Application Priority Data

Jun. 23, 2008 (EP) .................. 08011375

(51) Int. Cl.
*B23K 31/02* (2006.01)
(52) U.S. Cl. .................. 228/233.2; 228/245
(58) Field of Classification Search ........ None
See application file for complete search history.

(56) References Cited

U.S. PATENT DOCUMENTS

| | | | | | |
|---|---|---|---|---|---|
| 3,945,111 | A | * | 3/1976 | Greeson et al. | 228/175 |
| 3,969,500 | A | * | 7/1976 | Kennerley | 510/443 |
| 4,639,388 | A | * | 1/1987 | Ainsworth et al. | 428/117 |
| 4,690,876 | A | * | 9/1987 | Mizuhara | 428/606 |
| 4,713,217 | A | * | 12/1987 | Stern | 420/452 |
| 6,024,792 | A | | 2/2000 | Kurz et al. | |
| 6,206,265 | B1 | * | 3/2001 | Yamaoka | 228/102 |
| 6,454,885 | B1 | | 9/2002 | Chesnes et al. | |
| 6,503,349 | B2 | * | 1/2003 | Pietruska et al. | 148/562 |
| 6,520,401 | B1 | * | 2/2003 | Miglietti | 228/194 |
| 7,398,912 | B2 | * | 7/2008 | Shinkai et al. | 228/122.1 |
| 2003/0136811 | A1 | * | 7/2003 | Philip | 228/119 |
| 2004/0056079 | A1 | * | 3/2004 | Srinivasan | 228/248.1 |
| 2007/0039722 | A1 | * | 2/2007 | Angermann | 165/158 |
| 2007/0175546 | A1 | | 8/2007 | Hoppe et al. | |

FOREIGN PATENT DOCUMENTS

| | | |
|---|---|---|
| EP | 0293695 A1 | 12/1988 |
| EP | 0412397 B1 | 2/1991 |
| EP | 0486489 B1 | 5/1992 |
| EP | 0786017 B1 | 7/1997 |
| EP | 0892090 A1 | 1/1999 |
| EP | 1226896 A2 | 7/2002 |
| EP | 1258545 A1 | 11/2002 |
| EP | 1293286 A2 | 3/2003 |
| EP | 1306454 A1 | 5/2003 |

(Continued)

OTHER PUBLICATIONS

Kennedy A et al: "Braze Repair of Gas Turbine Components: Retrospective, Perspective, Prospective" Proceedings From Joining of Advanced and Specialty Materials, ASM International, US, vol. 2, Oct. 9, 2000, pp. 52-57, XP009063457 * pp. 53 & 55.

*Primary Examiner*—Kiley Stoner

(57) ABSTRACT

In soldering processes according to prior art, there is often an insufficient tie-up to a substrate of a component. A method in which no voids occur during the soldering processes is provided. A temperature pattern is proposed according to the method in which the temperature is lowered successively during the soldering operation.

17 Claims, 4 Drawing Sheets

FOREIGN PATENT DOCUMENTS

| | | |
|---|---|---|
| EP | 1319729 A1 | 6/2003 |
| EP | 1204776 B1 | 6/2004 |
| EP | 1867423 A1 | 6/2006 |
| EP | 1783237 A2 | 5/2007 |
| WO | WO 9967435 A1 | 12/1999 |
| WO | WO 0044949 A1 | 8/2000 |

* cited by examiner

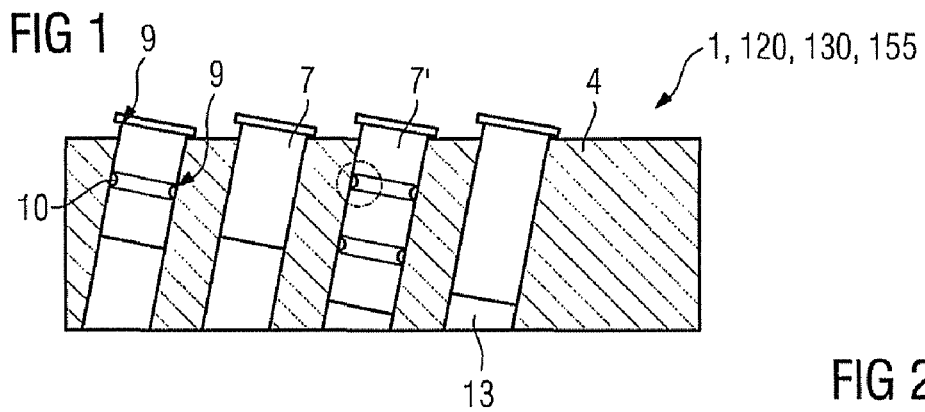
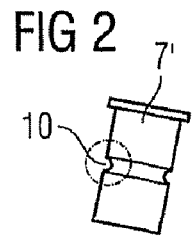
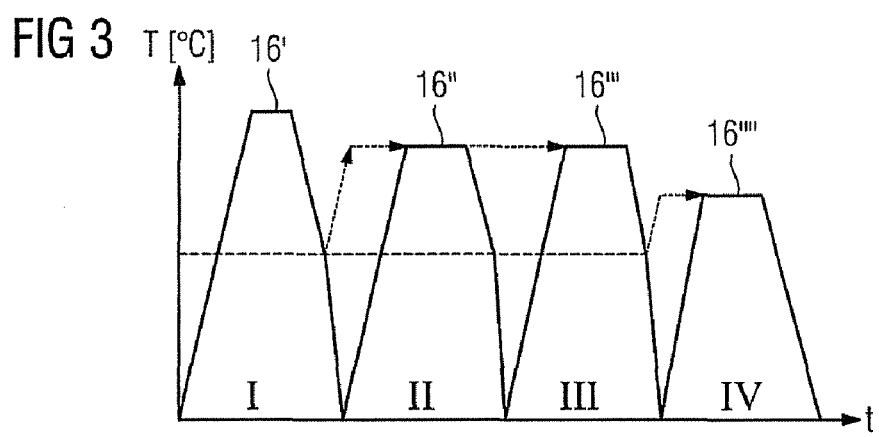
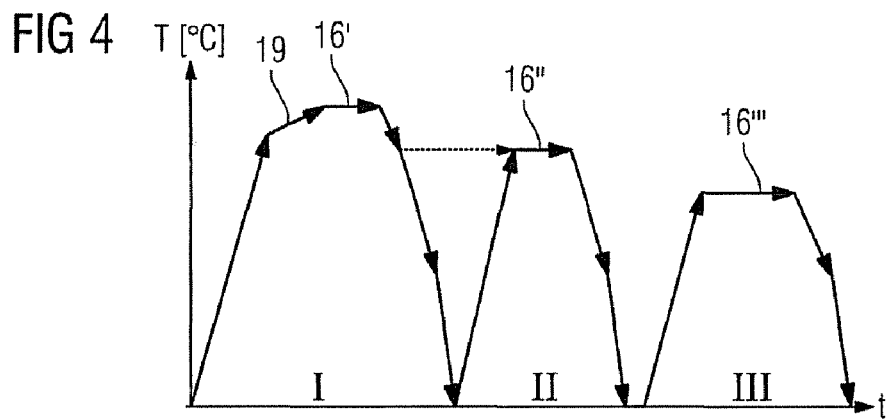

FIG 8

| Material | Chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-based precision-cast alloys | | | | | | | | | | | | | |
| GTD 222 | 0.10 | 22.5 | remainder | 19.0 | | 2.0 | 1.0 | | 1.2 | 2.3 | 0.008 | | |
| IN 939 | 0.15 | 22.4 | remainder | 19.0 | | 2.0 | 1.4 | 1.0 | 1.9 | 3.7 | 0.009 | 0.10 | |
| IN 6203 DS | 0.15 | 22.0 | remainder | 19.0 | | 2.0 | 1.1 | 0.8 | 2.3 | 3.5 | 0.010 | 0.10 | 0.75 |
| Udimet 500 | 0.10 | 18.0 | remainder | 18.5 | 4.0 | | | | 2.9 | 2.9 | 0.006 | 0.05 | |
| IN 738 LC | 0.10 | 16.0 | remainder | 8.5 | 1.7 | 2.6 | 1.7 | 0.9 | 3.4 | 3.4 | 0.010 | 0.10 | |
| SC 16 | <0.01 | 16.0 | remainder | | 3.0 | | 3.5 | | 3.5 | 3.5 | <0.005 | <0.008 | |
| Rene 80 | 0.17 | 14.0 | remainder | 9.5 | 4.0 | 4.0 | | | 3.0 | 5.0 | 0.015 | 0.03 | |
| GTD 111 | 0.10 | 14.0 | remainder | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | remainder | 9.0 | 1.9 | 4.1 | 4.1 | | 3.4 | 3.8 | 0.015 | 0.02 | |
| IN 792 DS | 0.08 | 12.5 | remainder | 9.0 | 1.9 | 4.1 | 4.1 | | 3.4 | 3.8 | 0.015 | 0.02 | 1.00 |
| MAR M 002 | 0.15 | 9.0 | remainder | 10.0 | | 10.0 | 2.5 | | 5.5 | 1.5 | 0.015 | 0.05 | 1.50 |
| MAR M 247 LC DS | 0.07 | 8.1 | remainder | 9.2 | 0.5 | 9.5 | 3.2 | | 5.6 | 0.7 | 0.015 | 0.02 | 1.40 |
| CMSX-2 | <.006 | 8.0 | remainder | 4.6 | 0.6 | 8.0 | 6.0 | | 5.6 | 1.0 | <.003 | <.0075 | |
| CMSX-3 | <.006 | 8.0 | remainder | 4.6 | 0.6 | 8.0 | 6.0 | | 5.6 | 1.0 | <.003 | <.0075 | 0.10 |
| CMSX-4 | | 6.0 | remainder | 10.0 | 0.6 | 6.0 | 6.0 | | 5.6 | 1.0 | | Re=3.0 | 0.10 |
| CMSX-6 | <.015 | 10.0 | remainder | 5.0 | 3.0 | <.10 | 2.0 | <.10 | 4.9 | 4.8 | <.003 | <.0075 | 0.10 |
| PWA 1480 SX | <.006 | 10.0 | remainder | 5.0 | | 4.0 | 12.0 | | 5.0 | 1.5 | <.0075 | <.0075 | |
| PWA 1483 SX | 0.07 | 12.2 | remainder | 9.0 | 1.9 | 3.8 | 5.0 | | 3.6 | 4.2 | 0.0001 | 0.002 | |
| Co-based precision-cast alloys | | | | | | | | | | | | | |
| FSX 414 | 0.25 | 29.0 | 10 | remainder | | 7.5 | | | | | 0.010 | | |
| X 45 | 0.25 | 25.0 | 10 | remainder | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | remainder | | 7.5 | 4 | | | 0.3 | 0.010 | 0.60 | |
| CM 247 | 0.07 | 8.3 | remainder | 10.0 | 0.5 | 9.5 | 3.2 | | 5.5 | 0.7 | | | 1.5 |

METHOD FOR SOLDERING WITH A MULTISTEP TEMPERATURE PROFILE

CROSS REFERENCE TO RELATED APPLICATIONS

This application claims priority of European application No. 08011375.6 filed Jun. 23, 2008, which is incorporated by reference herein in its entirety.

FIELD OF THE INVENTION

The invention relates to a soldering process with a plurality of temperature plateaus.

BACKGROUND OF THE INVENTION

Soldering is a known process for the connection of workpieces or for repair.

Components are also often provided with soldering inserts, the solder material, the substrate of the component and the soldering insert having different materials.

In soldering, care must be taken to ensure that no voids which reduce mechanical activity occur in the soldered joint.

SUMMARY OF THE INVENTION

The object of the invention, therefore, is to indicate a method in which no voids occur during soldering.

The object is achieved by a method according to the independent claim. The dependant claims list further advantageous measures which may be combined with one another, as desired, in order to achieve further advantages.

BRIEF DESCRIPTION OF THE DRAWINGS

In the drawing:

FIG. 1 shows a component with a soldering insert,

FIG. 2 shows a soldering insert,

FIGS. 3 and 4 show the thermal soldering method,

FIG. 8 shows a list of superalloys used.

Figure 5:
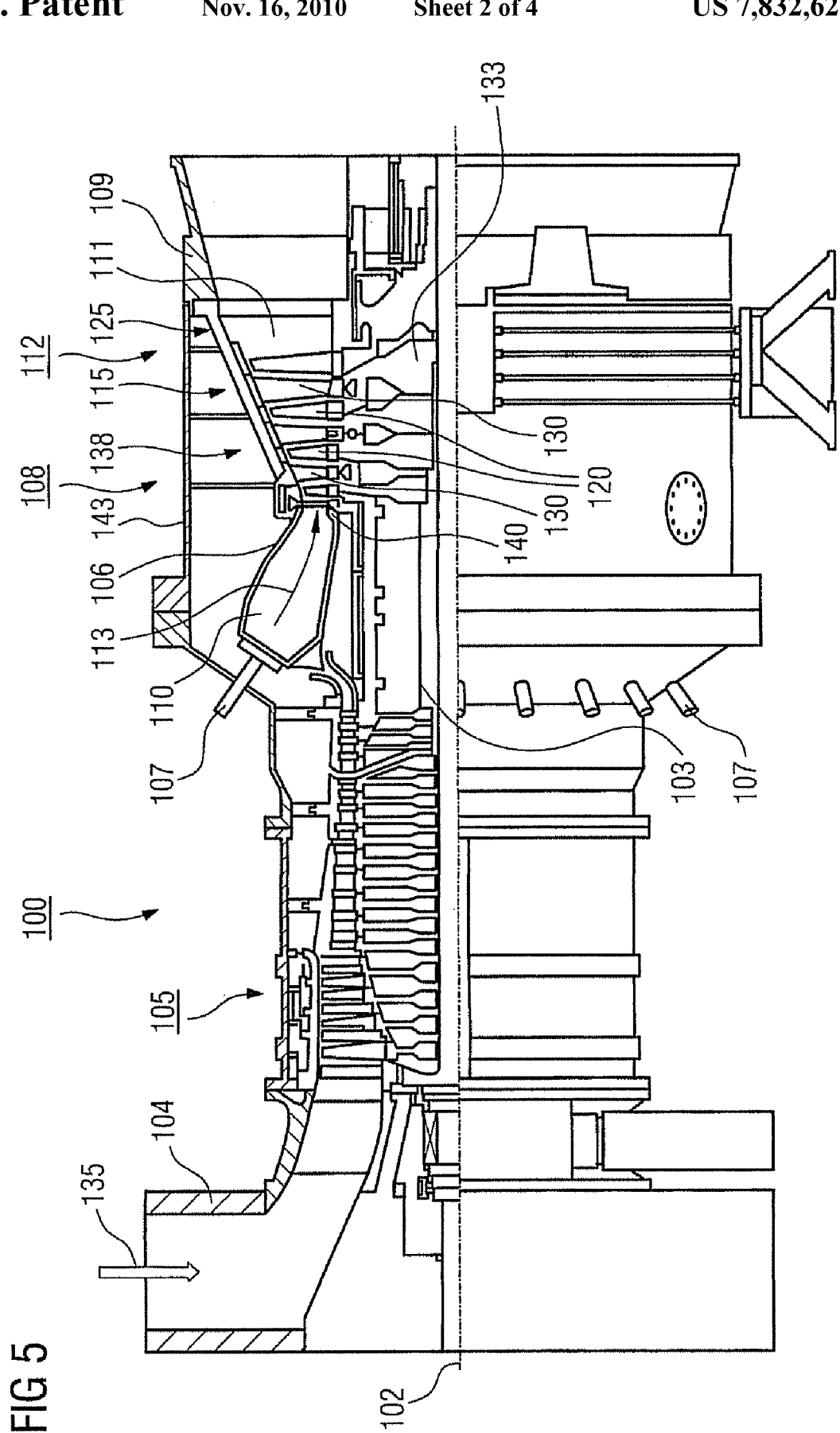
FIG. 5 shows a gas turbine.

The figures and the description illustrate only exemplary embodiments of the invention.

DETAILED DESCRIPTION OF THE INVENTION

FIG. 1 shows a component 1, 120, 130, 155 with a substrate 4.

The substrate 4 preferably has the material RENE80 or Alloy 247 LC CC. Further superalloys advantageously to be used are listed in FIG. 7.

The substrate 4 has a depression or a hole 13 which is to be closed. This takes place by soldering by means of a solder material 9, or the hole 13 is closed by means of a soldering insert 7 or 7' (FIG. 2) and a solder material 9. This may take place in that solder material 9 is applied to the soldering insert 7 over a large area, as is the case of the soldering insert 7', preferably a contraction 10 is present as a solder repository for solder material 9.

The soldering insert 7, 7' preferably consists of the material IN625 or Hastelloy X.

The solder material 9 used is preferably the solder alloy NI105 which has a soldering temperature of 1190° C., or the solder alloy AMDRY788 which has a soldering temperature of 1230° C.

According to the invention, preferably, the method is carried out with a plurality of temperature plateaus 16', 16'', . . . . Preferably, three (FIG. 4) or four (FIG. 3) temperature plateaus 16', 16'', . . . are used, in order to improve the tie-up of the solder material 9 to the substrate 4 by diffusion.

FIG. 3 illustrates a temperature profile in which various temperature plateaus 16', 16'' are used. In this case, in a first step, the component 1, 120, 130, 155 is heated to a temperature T' and is held there preferably for two hours. The temperature T' of the first temperature plateau 16' is preferably the highest temperature $T_{max}$ in the entire soldering method, hence T'>T'', T''', T'''', . . . , with the result that the solder material 9 is melted down completely at the start.

The temperature $T'=T_{max}$ is preferably higher than the customarily used soldering temperature of this solder material 9 (1190° C. in the case of NI105), so that 1200° C. is used for NI105. However, the customary soldering temperature may also be used, as with AMDRY788 (1230° C.).

After the first temperature plateau 16', a lowering of the temperature T to preferably below the temperature T'' of the following temperature plateau 16'', preferably to 650° C., most preferably to room temperature, takes place. In the case of Rene80 and Alloy 247, the temperature preferably amounts to 540° C.

This is followed by a reheating to a second temperature plateau 16'' with the temperature T''. This preferably also applies to the transitions between the further temperature plateaus 16'', 16''', . . . . In this case, a holding time preferably of two to four hours, in particular for four hours, is used.

The temperature T'' of the second temperature plateau 16'' is lowered preferably by at least 90° C., in particular by 100° C., in relation to the temperature T' of the first temperature plateau 16'.

In FIG. 3, this step is also repeated a second time.

The temperature T''' of the third temperature plateau 16''' is likewise lowered, but not as markedly between T' and T'', to be precise preferably by 15° C.

After the second temperature plateau 16'', a lowering preferably to below the temperature T''' of the third, that is to say following temperature plateau 16''' takes place. This is followed by a reheating to the temperature T'''.

As the last step, heat treatment, preferably at a temperature T'''' lowered anew, is carried out for a markedly longer holding time of twelve or twenty hours.

The holding temperature of the last temperature plateau 16'''' is lowered preferably by 190° C. in relation to the penultimate temperature T'''.

This method is suitable preferably for Rene80 with the solders NI105 and C0101.

FIG. 4 illustrates a three-step soldering method with three temperature plateaus 16', 16'', 16'''.

In this case, in a first step, the component 1, 120, 130, 155 is heated to a temperature T' and is held there for preferably two hours. The temperature T' of the first temperature plateau 16' is preferably the highest temperature $T_{max}$ in the entire soldering method, hence T'>T'', T''', with the result that the solder material 9 is melted completely at the start.

This maximum temperature $T_{max}$ is preferably higher than the customarily used soldering temperature of this solder material 9 (1190° C. in the case of NI105), so that 1200° C. is used for NI105.

After the first temperature plateau 16', a lowering of the temperature T preferably to below the temperature T" of the following temperature plateau 16" takes place.

This is followed by a reheating to a second temperature plateau 16" with the temperature T". This preferably also applies to the transitions between the further temperature plateaus 16", 16'". In this case, a holding time preferably of two to four hours, in particular for four hours, is used.

The following preferably applies in each case:

$T'-T''=30°$ C. to 150° C., in particular 120° C. to 150° C.;

$T''-T'''=30°$ C. to 210° C., in particular 180° C. to 210° C.

The holding times for the first two temperature plateaus 16', 16" are preferably identical, preferably 2 h.

Preferably, the holding time of the third temperature plateau 16'" is at least twice as long, preferably ten times as long. Since the temperature of the third temperature plateau 16'" is lower, the diffusion rates are reduced and the holding times are prolonged.

Preferably, a ramp 19, that is to say a lower heating rate, is used to run up to the highest temperature T', in order to avoid overheating.

Preferably, the substrate material used is also Alloy 247 LL CC (FIG. 4). In this case, preferably, the solder alloy AMDRY788 is used.

FIG. 5 shows a gas turbine 100 by way of example in a longitudinal part section.

The gas turbine 100 has inside it a rotor 103 rotary-mounted about an axis of rotation 102 and having a shaft 101, which rotor is also designated as a turbine rotor.

An intake casing 104, compressor 105, a, for example, toroidal combustion chamber 110, in particular annular combustion chamber, with a plurality of coaxially arranged burners 107, a turbine 108 and the exhaust gas casing 109 follow one another along the rotor 103.

The annular combustion chamber 110 communicates with a, for example, annular hot-gas duct 111. There, for example, four turbine stages 112 connected in series form the turbine 108.

Each turbine stage 112 is formed, for example, from two blade rings. As seen in the direction of flow of a working medium 113, a row 125 formed from moving blades 120 follows a guide vane row 115 in the hot-gas duct 111.

The guide vanes 130 are in this case fastened to an inner casing 138 of a stator 143, whereas the moving blades 120 of a row 125 are attached to the rotor 103, for example, by means of a turbine disk 133.

A generator or a working machine (not illustrated) is coupled to the rotor 103.

When the gas turbine 100 is in operation, air 135 is sucked in by the compressor 105 through the intake casing 104 and is compressed. The compressed air provided at the turbine-side end of the compressor 105 is routed to the burners 107 and is mixed there with a fuel. The mixture is then burnt in the combustion chamber 110 so as to form the working medium 113. The working medium 113 flows from there along the hot-gas duct 111 past the guide vanes 130 and the moving blades 120. At the moving blades 120, the working medium 113 expands so as to transmit a pulse, with the result that the moving blades 120 drive the rotor 103 and the latter drives the working machine coupled to it.

The components exposed to the hot working medium 113 are subject to thermal loads while the gas turbine 100 is in operation. The guide vanes 130 and moving blades 120 of the first turbine stage 112, as seen in the direction of flow of the working medium 113, are subjected to the most thermal load, in addition to the heat shield elements lining the annular combustion chamber 110.

In order to withstand the temperatures prevailing there, these can be cooled by means of a coolant.

Substrates of the components may likewise have a directional structure, that is to say they are monocrystalline (SX structure) or have only longitudinally directed grains (DS structure).

For example, iron-, nickel- or cobalt-based superalloys are used as material for the components, in particular for the turbine blade 120, 130 and components of the combustion chamber 110.

Such superalloys are known, for example, from EP 1 204 776 B1, EP 1 306 454, EP 1 319 729 A1, WO 99/67435 or WO 00/44949; these publications are part of the disclosure in respect of the chemical composition of the alloys.

The guide vane 130 has a guide vane foot (not illustrated here) facing the inner casing 138 of the turbine 108 and a guide vane head lying opposite the guide vane foot. The guide vane head faces the rotor 103 and is secured to a fastening ring 140 of the stator 143.

Figure 6:
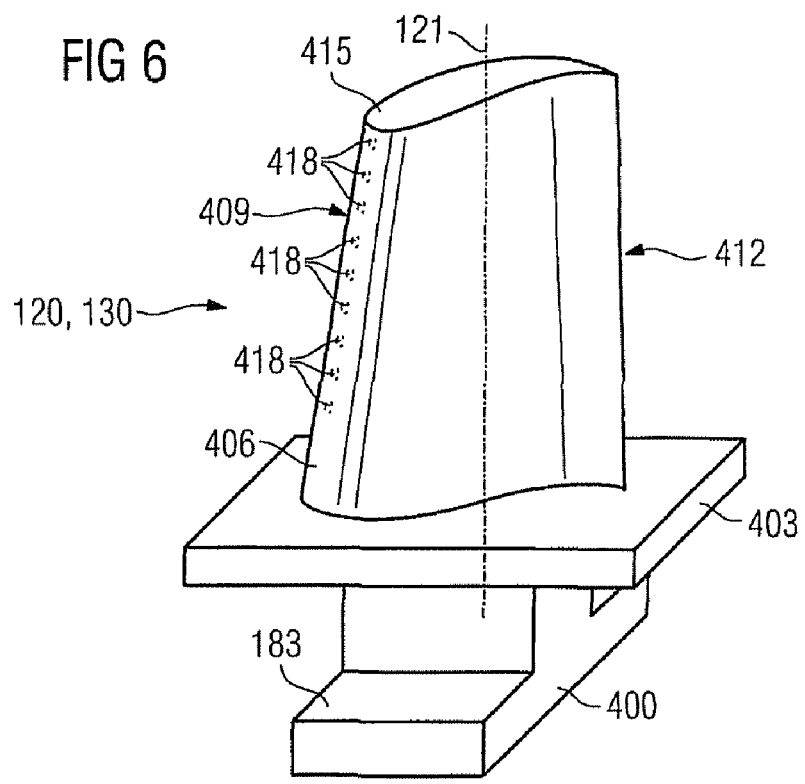
FIG. 6 shows a turbine blade in perspective.

FIG. 6 shows a perspective view of a moving blade 120 or guide vane 130 of a turbomachine, which extends along a longitudinal axis 121.

The turbomachine may be a gas turbine of an aircraft or of a power station for electricity generation, a steam turbine or a compressor.

The blade 120, 130 has successively along the longitudinal axis 121 a fastening region 400, a blade platform 403 contiguous to the latter and also a blade leaf 406 and a blade tip 415.

As a guide vane 130, the blade 130 may have a further platform (not illustrated) at its blade tip 415.

In the fastening region 400, a blade foot 183 is formed, which serves (not illustrated) for fastening the moving blades 120, 130 to a shaft or a disk.

The blade foot 183 is configured, for example, as a hammer head. Other configurations as a pinetree or dovetails are possible.

The blade 120, 130 has a leading edge 409 and a trailing edge 412 for a medium which flows past the blade leaf 406.

In conventional blades 120, 130, for example, solid metallic materials, in particular superalloys, are used in all the regions 400, 403, 406 of the blade 120, 130.

Such superalloys are known, for example, from EP 1 204 776 B2, EP 1 306 454, EP 1 319 729 A1, WO 99/67435 or WO 00/44949; these publications are part of the disclosure in respect of the chemical composition of the alloy.

The blade 120, 130 may in this case be manufactured by a casting method, also by means of directional solidification, by a forging method, by a milling method or by combinations of these.

Workpieces with a monocrystalline structure or structures are used as components for machines which are exposed to high mechanical, thermal and/or chemical loads during operation.

The manufacture of monocrystalline workpieces of this type takes place, for example, by directional solidification from the melt. This involves casting methods in which the liquid metallic alloy solidifies into the monocrystalline structure, that is to say into the monocrystalline workpiece, or directionally.

In this case, dendritic crystals are oriented along the heat flow and form either a columnar-crystalline grain structure (columnar, that is to say grains which run over the entire length of the workpiece and here, according to general linguistic practice, are designated as being directionally solidified) or a monocrystalline structure, that is to say the entire workpiece consists of a single crystal. In these methods, the transition to globulitic (polycrystalline) solidification must be avoided, since undirected growth necessarily results in the formation of transverse and longitudinal grain boundaries which nullify the good properties of the directionally solidified or monocrystalline component.

When directionally solidified structures are referred to in general terms, this means both monocrystals which have no grain boundaries or at most low-angle grain boundaries and columnar-crystal structures which have grain boundaries running in the longitudinal direction, but no transverse grain boundaries. Where these second-mentioned crystalline structures are concerned, directionally solidified structures are also referred to.

Such methods are known from U.S. Pat. No. 6,024,792 and EP 0 892 090 A1; these publications are part of the disclosure in respect of the solidification method.

The blades 120, 130 may likewise have coatings against corrosion or oxidation, for example (MCrAlX; M is at least one element of the group iron (Fe), cobalt (Co), nickel (Ni), X is an active element and stands for yttrium (Y) and/or silicon and/or at least one rare earth element or hafnium (Hf)). Such alloys are known from EP 0 486 489 B1, EP 0 786 017 B1, EP 0 412 397 B1 or EP 1 306 454 A1 which are to be part of this disclosure in respect of the chemical composition of the alloy.

The density preferably lies around 95% of the theoretical density.

A protective aluminum oxide layer (TGO=thermal grown oxide layer) is formed on the MCrAlX layer (as an intermediate layer or as the outermost layer).

The layer composition preferably has Co-30Ni-28Cr-8Al-0.6Y-0.7Si or Co-28Ni-24Cr-10Al-0.6Y. In addition to these cobalt-based protective coatings, preferably nickel-based protective layers are also used, such as Ni-10Cr-12Al-0.6Y-3Re or Ni-12Co-21Cr-11Al-0.4Y-2Re or Ni-25Co-17Cr-10Al-0.4Y-1.5Re.

On the MCrAlX, a heat insulation layer may also be present, which is preferably the outermost layer and consists, for example, of $ZrO_2$, $Y_2O_3$—$ZrO_2$, that is to say it is not or is partially or completely stabilized by yttrium oxide and/or calcium oxide and/or magnesium oxide.

The heat insulation layer covers the entire MCrAlX layer.

By means of suitable coating methods, such as, for example, electron beam vapor deposition (EB-PVD), columnar grains are generated in the heat insulation layer.

Other coating methods may be envisaged, for example atmospheric plasma spraying (APS), LPPS, VPS or CVD. The heat insulation layer may have porous microcrack- or macrocrack-compatible grains for better thermal shock resistance. The heat insulation layer is therefore preferably more porous than the MCrAlX layer.

The blade 120, 130 may be of hollow or solid design. If the blade 120, 130 is to be cooled, it is hollow and, if appropriate, also has film cooling holes 418 (indicated by dashes).

Figure 7:
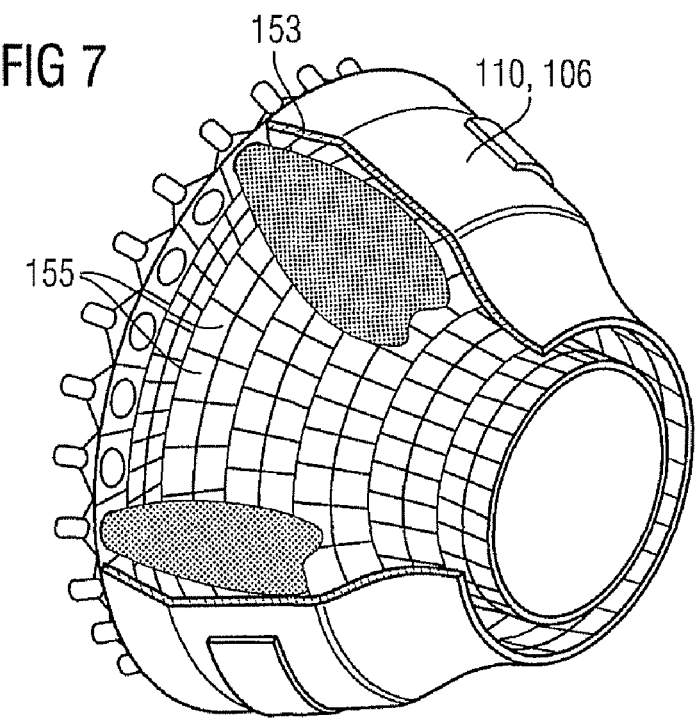
FIG. 7 shows a combustion chamber in perspective.

FIG. 7 shows a combustion chamber 110 of the gas turbine 100. The combustion chamber 110 is configured, for example, as what is known as an annular combustion chamber, in which a multiplicity of burners 107 arranged around an axis of rotation 102 in the circumferential direction issue into a common combustion chamber space 154 and generate flames 156. For this purpose, the combustion chamber 110 is configured as a whole as an annular structure which is positioned around the axis of rotation 102.

To achieve a comparatively high efficiency, the combustion chamber 110 is designed for a comparatively high temperature of the working medium M of about 1000° C. to 1600° C. In order to make it possible to have a comparatively long operating time even in the case of these operating parameters which are unfavorable for the materials, the combustion chamber wall 153 is provided on its side facing the working medium M with an inner lining formed from heat shield elements 155.

Moreover, on account of the high temperatures inside the combustion chamber 110, a cooling system may be provided for the heat shield elements 155 or for their holding elements. The heat shield elements 155 are then, for example, hollow and, if appropriate, also have cooling holes (not illustrated) issuing into the combustion chamber space 154.

Each heat shield element 155 consisting of an alloy is equipped on the working medium side with a particularly heat-resistant protective layer (MCrAlX layer and/or ceramic coating) or is manufactured from materials resistant to high temperature (solid ceramic bricks).

These protective layers may be similar to those of the turbine blades, that is to say, for example, MCrAlX means: M is at least one element of the group iron (Fe), cobalt (Co), Nickel (Ni), X is an active element and stands for yttrium (Y) and/or silicon and/or at least one rare earth element or hafnium (Hf). Such alloys are known from EP 0 486 489 B1, EP 0 786 017 B1, EP 0 412 397 B1 or EP 1 306 454 A1 which are to be part of this disclosure in respect of the chemical composition of the alloy.

On the MCrAlX, a, for example, ceramic heat insulation layer may also be present and consists, for example, of $ZrO_2$, $Y_2O_3$—$ZrO_2$, that is to say it is not or is partially or completely stabilized by yttrium oxide and/or calcium oxide and/or magnesium oxide.

By means of suitable coating methods, such as, for example, electron beam vapor deposition (EB-PVD), columnar grains are generated in the heat insulation layer.

Other coating methods may be envisaged, for example atmospheric plasma spraying (APS), LPPS, VPS or CVD. The heat insulation layer may have porous microcrack- or macrocrack-compatible grains for better thermal shock resistance.

Refurbishment means that turbine blades 120, 130 and heat shield elements 155, after use, must, where appropriate, be freed of protective layers (for example, by sandblasting). A removal of the corrosion and/or oxidation layers or products then takes place. If appropriate, cracks in the turbine blade 120, 130 or in the heat shield element 155 are also repaired. This is followed by a recoating of the turbine blades 120, 130 and heat shield elements 155 and by a renewed use of the turbine blades 120, 130 or of the heat shield elements 155.

The invention claimed is:

1. A method for soldering a component by a solder material, comprising: soldering the component using a first temperature plateau; and soldering the component using a second temperature plateau; wherein a temperature of the second temperature plateau is lower than a temperature of the first temperature plateau; wherein the temperature of the first temperature plateau is lowered to below the temperature of the second temperature plateau and is raised again to the temperature of the second temperature plateau; and wherein the temperature of the first temperature plateau is cooled to below 650° C. before raising again to the temperature of the second temperature plateau.

2. The method as claimed in claim 1, wherein the solder material is heated to a temperature of the first temperature plateau and is held with the temperature of the first temperature plateau for a specific time period when starting the soldering.

3. The method as claimed in claim 1, wherein a temperature of the first temperature plateau is a highest temperature in the soldering.

4. The method as claimed in claim 1, wherein the temperature of the second temperature plateau is at least 90° C. lower than the temperature of the first temperature plateau.

5. The method as claimed in claim 1, wherein the temperature of the first temperature plateau is cooled to below 540° C. before raising again to the temperature of the second temperature plateau.

6. The method as claimed in claim 1, wherein the temperature of the first temperature plateau is cooled to below a room temperature before raising again to the temperature of the second temperature plateau.

7. The method as claimed in claim 1, wherein the temperature of the first temperature plateau decreases continuously.

8. The method as claimed in claim 1, wherein a third temperature plateau is used for the soldering.

9. The method as claimed in claim 7, wherein the temperature of the third temperature is at least 20° C. lower than a temperature of the second temperature plateau.

10. The method as claimed in claim 8, wherein a fourth temperature plateau is used for the soldering.

11. The method as claimed in claim 10, wherein a temperature of the fourth temperature plateau is a lowest temperature in the soldering.

12. The method as claimed in claim 1, wherein a temperature of the first temperature plateau is higher than a customarily used soldering temperature for the solder material.

13. The method as claimed in claim 12, wherein the temperature of the first temperature plateau is at least 10° C. higher than the customarily used soldering temperature for the solder material.

14. The method as claimed in claim 1, wherein the soldering is performed in a substrate of the component by a soldering insert.

15. The method as claimed in claim 14, wherein the substrate comprises RENE80 or Alloy LC CC.

16. The method as claimed in claim 14, wherein the soldering insert comprises IN625 or Hastelloy X.

17. The method as claimed in claim 1, wherein the solder material comprises NI105, CO101, or AMDRY 788.

* * * * *